(12) United States Patent
Swaminathan et al.

(10) Patent No.: US 9,619,653 B2
(45) Date of Patent: *Apr. 11, 2017

(54) SYSTEM AND METHOD FOR DETECTING A SECURITY COMPROMISE ON A DEVICE

(71) Applicant: Adobe Systems Incorporated, San Jose, CA (US)

(72) Inventors: Viswanathan Swaminathan, Saratoga, CA (US); Sheng Wei, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/512,346

(22) Filed: Oct. 10, 2014

(65) Prior Publication Data

US 2015/0033031 A1    Jan. 29, 2015

Related U.S. Application Data

(63) Continuation-in-part of application No. 13/563,480, filed on Jul. 31, 2012, now Pat. No. 8,862,892.

(51) Int. Cl.
  *G06F 21/57* (2013.01)
  *G06F 21/10* (2013.01)
  *G06F 21/55* (2013.01)

(52) U.S. Cl.
  CPC .......... *G06F 21/577* (2013.01); *G06F 21/10* (2013.01); *G06F 21/554* (2013.01)

(58) Field of Classification Search
  CPC ....... G06F 21/554; G06F 21/577; G06F 21/10
  See application file for complete search history.

(56) References Cited

U.S. PATENT DOCUMENTS 7,996,672 B1    8/2011  Agrawal et al.
8,196,213 B2    6/2012  Klucher et al.
(Continued)

OTHER PUBLICATIONS

Stack Overflow post, "How do I detect that an iOS app is running on a jailbroken phone ?", 2009, pp. 1-6.*
(Continued)

*Primary Examiner* — Michael Pyzocha
(74) *Attorney, Agent, or Firm* — Wolfe-SBMC

(57) ABSTRACT

Embodiments of a system and method for detecting a security compromise on a device are described. Embodiments may be implemented by a content consumption application configured to protect content decryption keys on a device, such as a computer system (e.g., a desktop or notebook computer) or a mobile device (e.g., a smartphone or tablet). For instance, the content consumption application may be configured to provide decryption keys for respective content to a media component (or another component of the operating system) if multiple conditions have been met. For instance, in various embodiments, the content consumption application may pass the key to the media component after ensuring that i) one or more security mechanisms of the device operating system have not been compromised and ii) one or more executable instructions of the content consumption application have not been tampered (e.g., instructions corresponding to a function that handles the decryption key(s)).

20 Claims, 6 Drawing Sheets

(56) References Cited

U.S. PATENT DOCUMENTS

| | | | |
|---|---|---|---|
| 8,561,154 B2* | 10/2013 | Bunn | H04L 63/102 713/169 |
| 8,650,543 B1* | 2/2014 | Winch | G06F 9/44505 717/120 |
| 8,850,216 B1* | 9/2014 | Mikhailov | G06F 21/10 713/182 |
| 8,862,892 B2 | 10/2014 | Swaminathan et al. | |
| 2002/0138804 A1 | 9/2002 | Sangha et al. | |
| 2002/0183056 A1 | 12/2002 | Lundblade et al. | |
| 2003/0126462 A1* | 7/2003 | Howard | H04W 12/12 726/4 |
| 2003/0126608 A1 | 7/2003 | Safadi et al. | |
| 2004/0064712 A1 | 4/2004 | Arthur et al. | |
| 2004/0243881 A1* | 12/2004 | Wang | G06F 21/53 714/37 |
| 2006/0095970 A1* | 5/2006 | Rajagopal | G06F 21/577 726/25 |
| 2006/0218395 A1 | 9/2006 | Maes | |
| 2007/0061596 A1* | 3/2007 | Ferguson | G06F 12/1408 713/193 |
| 2007/0261120 A1* | 11/2007 | Arbaugh | G06F 21/57 726/26 |
| 2007/0286076 A1* | 12/2007 | Roever | H04L 12/2856 370/230 |
| 2008/0109679 A1* | 5/2008 | Wright | H04L 63/102 714/37 |
| 2009/0086964 A1 | 4/2009 | Agrawal et al. | |
| 2009/0119221 A1* | 5/2009 | Weston | G06Q 20/382 705/76 |
| 2010/0011446 A1* | 1/2010 | Klucher | G06F 21/10 726/27 |
| 2010/0064139 A1 | 3/2010 | Courington | |
| 2010/0082940 A1 | 4/2010 | Nito et al. | |
| 2010/0122076 A1* | 5/2010 | Witty | G06F 21/575 713/2 |
| 2010/0146301 A1 | 6/2010 | Shevchenko et al. | |
| 2010/0174919 A1 | 7/2010 | Ito et al. | |
| 2010/0223656 A1* | 9/2010 | Ray | G06F 21/57 726/3 |
| 2011/0072266 A1* | 3/2011 | Takayama | G06F 21/445 713/169 |
| 2012/0131685 A1* | 5/2012 | Broch | G06F 21/554 726/30 |
| 2012/0137015 A1 | 5/2012 | Sun | |
| 2012/0167162 A1* | 6/2012 | Raleigh | G06F 21/57 726/1 |
| 2012/0266259 A1 | 10/2012 | Lewis | |
| 2012/0284804 A1* | 11/2012 | Lindquist | H04L 63/0428 726/29 |
| 2012/0311322 A1* | 12/2012 | Koyun | G06Q 20/3227 713/156 |
| 2013/0031541 A1* | 1/2013 | Wilks | G06F 8/665 717/176 |
| 2013/0031631 A1* | 1/2013 | Waltermann | G06F 21/575 726/23 |
| 2013/0219178 A1* | 8/2013 | Xiques | H04L 9/083 713/168 |
| 2013/0312099 A1 | 11/2013 | Edwards et al. | |
| 2013/0326288 A1* | 12/2013 | Datta | G06F 11/0754 714/48 |
| 2014/0006760 A1* | 1/2014 | Nemiroff | H04L 9/3247 713/1 |
| 2014/0040630 A1 | 2/2014 | Swaminathan | |
| 2015/0089645 A1* | 3/2015 | Vandergeest | G06F 21/55 726/23 |

OTHER PUBLICATIONS

"How to restrict applications using AppLocker" posted by George, Dec. 11, 2010, 5 pages.*

"Final Office Action", U.S. Appl. No. 13/563,480, Jan. 22, 2014, 22 pages.

"Non-Final Office Action", U.S. Appl. No. 13/563,480, Jul. 16, 2013, 21 pages.

"Notice of Allowance", U.S. Appl. No. 13/563,480, Jul. 14, 2014, 7 pages.

Cox, "Apple quietly drops iOS jailbreak detection API", Retrieved from <http://www.networkworld.com/news/2010/121010-apple-ios-jailbreak.html> on Jul. 16, 2013, Dec. 10, 2010, 8 pages.

Diatchki, et al., "Strongly Typed Memory Areas Programming Systems—Level Data Structures in a Functional Language", Proceedings of the 2006 ACM SIGPLAN workshop on Haskell, Sep. 2006, pp. 72-83.

Holt, et al., "Application and Architectural Bottlenecks in Large Scale Distributed Shared Memory Machines", ACM SIGARCH Computer Architecture News—Special Issue: Proceedings of the 23rd annual international symposium on Computer architecture (ISCA '96) vol. 24 Issue 2, May 1996, pp. 134-145.

Sharif, et al., "Secure In-VM Monitoring Using Hardware Virtualization", Proceedings of the 16th ACM conference on Computer and communications security, Nov. 2009, pp. 477-487.

Waheed, et al., "A Model for Instrumentation System Management in Concurrent Computer Systems", Proceedings of the 28th Hawaii International Conference on System Sciences, Jan. 1995, pp. 432-441.

* cited by examiner

SYSTEM AND METHOD FOR DETECTING A SECURITY COMPROMISE ON A DEVICE

PRIORITY APPLICATION

This Application claims priority under 35 U.S.C. Section 120 as a continuation of U.S. patent application Ser. No. 13/563,480, filed Jul. 31, 2012, and titled "System and Method for Detecting a Security Compromise on a Device", the entire disclosure of which is hereby incorporated by reference in its entirety.

BACKGROUND

Detecting whether a computer system or computing device has been compromised may present challenges.

To combat unauthorized consumption of content, some content owners have adopted an approach to protecting their content known as digital rights management ("DRM"), which may include various techniques for limiting access of electronic content to authorized individuals and/or enforcing other restrictions on the use of such content. Typically, clear content that is to be protected by DRM is encoded and packaged into an encrypted form. At packaging time, the packaging unit responsible for packaging content may utilize various types of encryption algorithms for encrypting content. In some cases, these encryption algorithms may encrypt content based on a cryptographic key, which may be selected or generated in a random fashion. At some point, the encrypted content may be provided to an electronic device associated with a content consumer. For instance, the consumer may pay a one-time fee or a recurring subscription fee to access the content electronically. To view the content in unencrypted form on the consumer's electronic device, the device may be required to obtain a respective content license that includes the correct cryptographic key for decrypting the content.

In some cases, decryption keys may be compromised by malware or an attacker. If a decryption key is compromised, an attacker may use the key to generate a clear version of the corresponding content with no DRM restrictions. In some cases, the compromised key or the clear content itself (e.g., a copyrighted movie) may be freely distributed through various outlets, such as a file sharing network, which may represent a significant revenue loss for the content owner.

SUMMARY

Various embodiments of a system and method for detecting a security compromise on a device are described. Embodiments may be implemented by a content consumption application configured to protect content decryption keys on a device, such as a computer system (e.g., a desktop or notebook computer) or a mobile device (e.g., a smartphone or tablet). For instance, the content consumption application may be configured to provide decryption keys for respective content to a media component (or another component of the operating system) if multiple conditions have been met. For instance, the content consumption component may pass the decryption key(s) to the media component through an open interface; the techniques described herein may ensure that it is safe for the key to be passed without risk of being exposed to an attacker (e.g., through a debugging application) and/or to malware. For instance, in various embodiments, the content consumption application may pass the key to the media component after ensuring that i) one or more security mechanisms of the device operating system have not been compromised and ii) one or more executable instructions of the content consumption application have not been tampered (e.g., instructions corresponding to a function that handles the decryption key(s)). As described in more detail below, these techniques may include but are not limited to checking for the presence of files associated with inauthentic or altered operating systems, attempting to execute an application having an invalid signature, attempting to perform prohibited operations, executing anti-debugging functions, and/or performing a hash check on instructions of an application that handles decryption keys.

Figure 1:
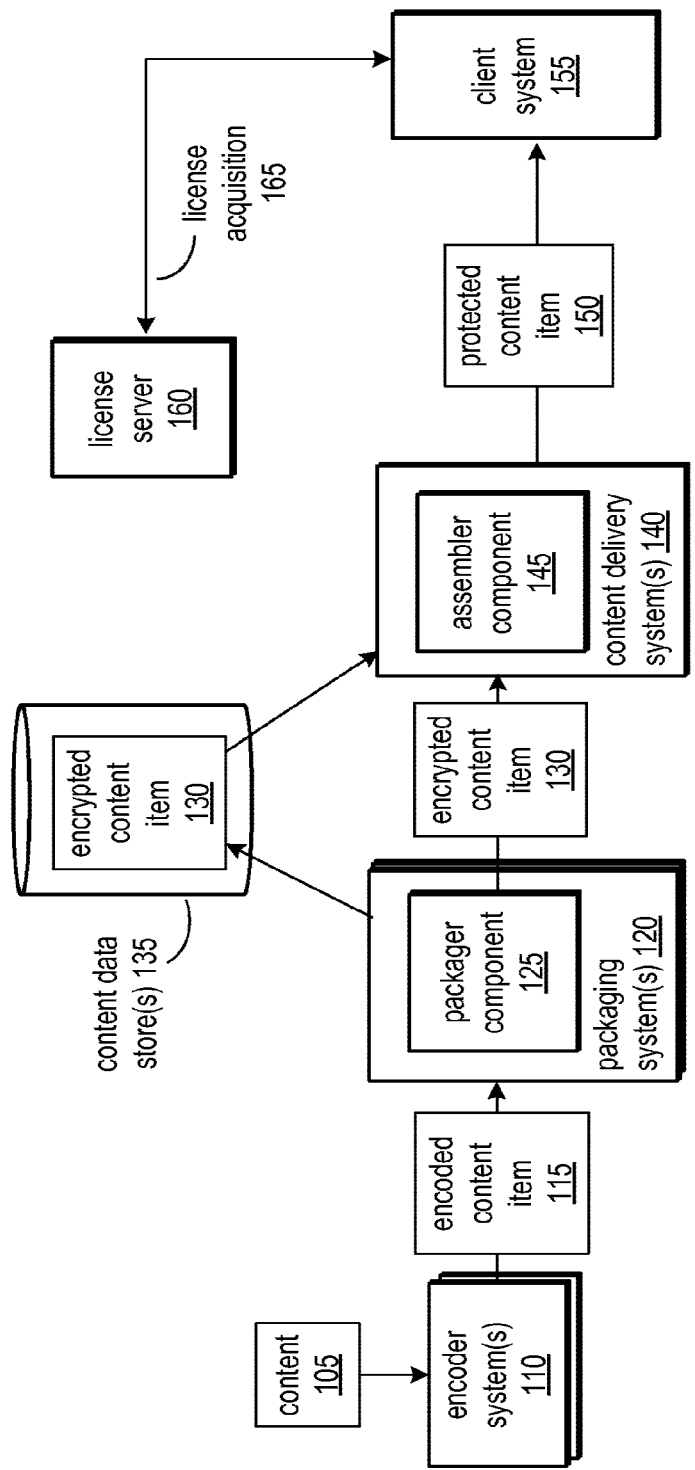
FIG. 1 illustrates block diagram of an example system in which a protected (e.g., encrypted) content item may be generated and distributed, according to some embodiments.

While the system and method for detecting a security compromise on a device is described herein by way of example for several embodiments and illustrative drawings, those skilled in the art will recognize that the system and method for detecting a security compromise on a device is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for detecting a security compromise on a device as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for detecting a security compromise on a device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from a software program. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are need not be limited by the principles of a conventional client-server architecture.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 6:
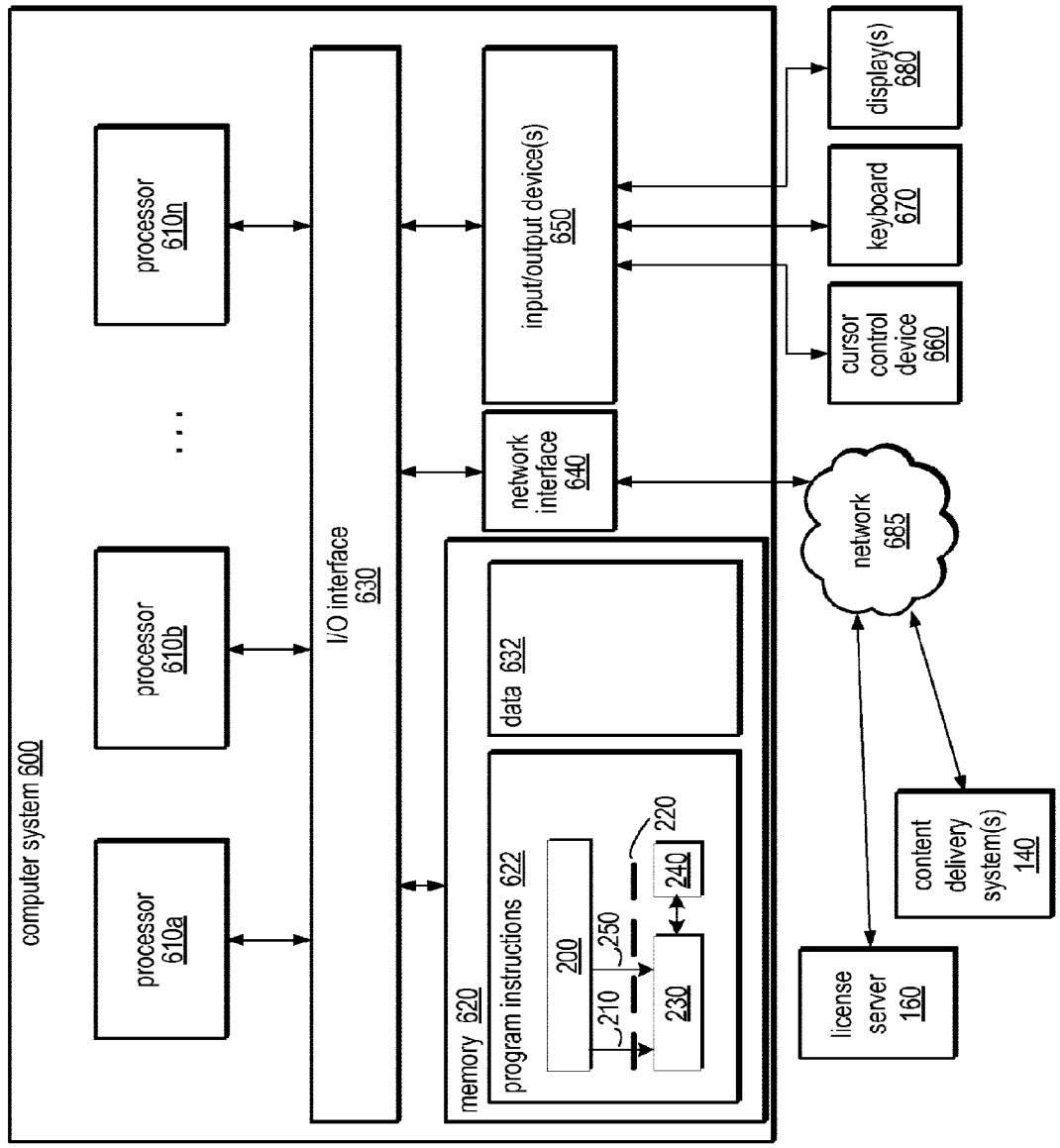
FIG. 6 illustrates an example computer system suitable for implementing various components of the system and method for detecting a security compromise on a device, according to various embodiments.

In various instances, this detailed description may refer to a devices configured to perform content consumption, such as client systems 155a-b. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 6.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key—private key pair with such a private key. Additionally, in some cases, a public key—private key pair may be referred to as simply a "key pair." Note that in various embodiments, public key—private key pairs may be generated via one or more key derivation functions, such as those described above.

Embodiments of the system and method for detecting a security compromise on a device may be implemented by a content consumption application configured to protect content decryption keys on a device, such as a computer system (e.g., a desktop or notebook computer) or a mobile device (e.g., a smartphone or tablet). For instance, the content consumption application may be configured to provide decryption keys for respective content to a media component (or another component of the operating system) if multiple conditions have been met. For instance, the content consumption component may pass the decryption key(s) to the media component through an open interface; the techniques described herein may ensure that it is safe for the key to be passed without risk of being exposed to an attacker (e.g., through a debugging application) and/or to malware. For instance, in various embodiments, the content consumption application may pass the key to the media component after ensuring that i) one or more security mechanisms of the device operating system have not been compromised and ii) one or more executable instructions of the content consumption application have not been tampered (e.g., instructions corresponding to a function that handles the decryption key(s)). Specific techniques for ensuring the security mechanisms of the operating system have not been compromised and ensuring the content consumption application has not been tampered are described in more detail below.

FIG. 1 illustrates a flow diagram of a framework for encoding, packaging, assembling and distributing content according to embodiments of the system and method for detecting a security compromise on a device. In the illustrated embodiment, content 105 may represent a media object, which may include any type of media program that may be represented and/or stored as electronic content (e.g., electronic representations of audio, video, images, presentations or some combination thereof). In various embodiments, a media program may include prerecorded content including but not limited to movies or motion pictures, television programs, video clips or snippets, audio productions, as well as live content including but not limited to content conveying real-time or near-real time events (e.g., a live sporting event or competition). One or more encoder systems 110 may be configured to input content 105 and generate an encoded content items 115 corresponding to content 105. In various embodiments, encoder systems may encode or compress content 105 according to one or more codecs or standards for video compression in order to generate encoded content item 115. One non-limiting example of such a standard includes the H.264 standard.

For clarity of illustration, only a single encoded content item 115 is presented in the illustrated embodiment. However, it should be understood that the illustrated system may create multiple encoded content items. For instance, in various embodiments, different encoded content items may represent different temporal segments of the same media object. For example, if the media object were a movie, each encoded content item may represent a different temporal segment of that movie. Each temporal segment may be specified by a different time period of the movie, a different set of frames within the movie or a different scene within the movie, for example.

In the illustrated embodiment, encoded content item 115 may be processed by a packager component 125. In various embodiments the packager component may be implemented on a packaging system 120, which may in some cases be implemented by a computer system, such as that illustrated in FIG. 6 described below. As illustrated, the packager component 125 may package and encrypt encoded content item 115 to generate a corresponding encrypted content item 130. In some embodiments, to support different client systems having different platforms or configurations, packager component 125 may be configured to generate a single encrypted content item 130 that may be assembled into a format that can be interpreted by different client systems or devices having different configurations.

In various embodiments, the encrypted content item 130 may be provided directly to content delivery system(s) 140 and/or stored in a content data store(s) 135. In one non-limiting example, live or near live content (e.g., content for a live sporting event) may be provided to content delivery system(s) 140 whereas other content may be stored in content data store(s) 135 and retrieved by content delivery system(s) 140 at a later time. Once assembler component 145 receives the encrypted content item 130, the assembler component may assemble the encrypted content item into a format that is consumable on client system 155.

In the illustrated embodiment, only one client system 155 is presented for clarity of illustration. It should be understood that in various embodiments, any number of client systems or devices may be supported. Non-limiting examples of these client devices include smartphones, tablet devices, laptop computers, notebook computers, and desktop computers.

To obtain the decryption key for decrypting a protected content item, the client system may perform a license acquisition 165 with license server 160. For instance, each encrypted content item may have a metadata portion that points to a license server and/or an appropriate protocol for carrying out license acquisition. If the server authenticates the respective client system, the server may issue the content license to the client system at 165. The content license may include a content encryption key that may be used to decrypt the protected content item received by that client system. In various embodiments, the client system may use this same content encryption key to decrypt subsequent protected (e.g., encrypted) content items. Of course, in various embodiments, decryption keys may change over time and license acquisition can be performed again when this happens. In other embodiments, other techniques for protecting the content encryption may be utilized. For instance, in some embodiments, when the client receives the content license, the content license may already include the content encryption key protected (e.g., encrypted) for that particular client.

Figure 2:
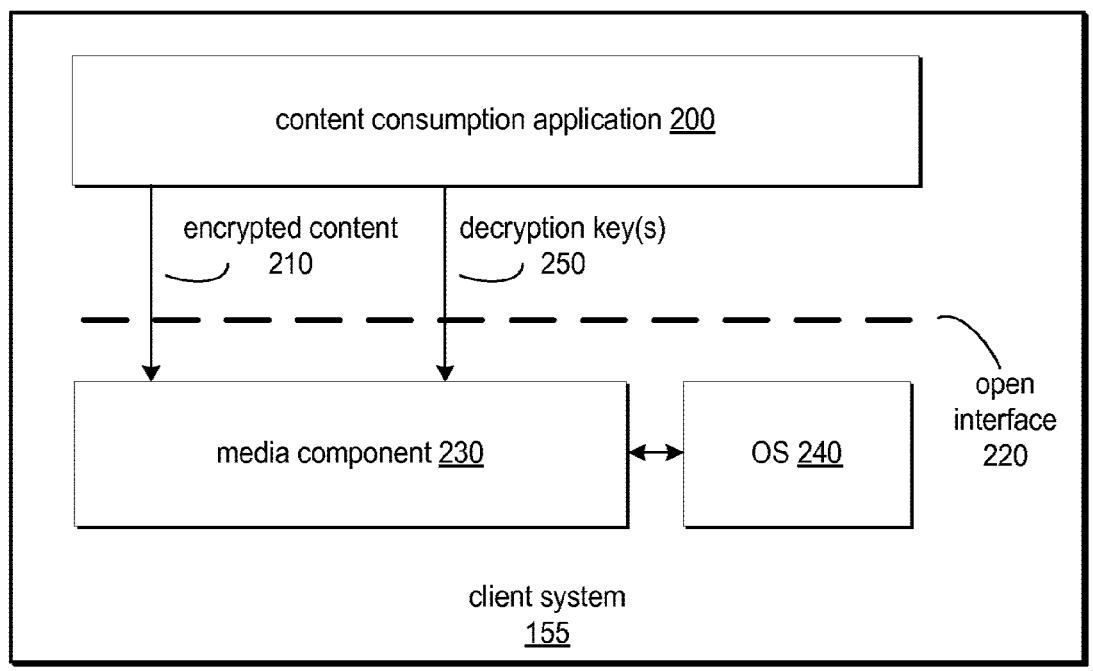
FIG. 2 illustrates a block diagram of an application configured to detect a security compromise on a device and in response to that detection withhold content decryption keys, according to some embodiments.

FIG. 2 illustrates an example client system including a content consumption application 200 that is configured to pass decryption keys for content after determining there has not been a security compromise on the client system, according to various embodiments. In the illustrated embodiment, client system 155 may be implemented by a computer system or other electronic devices, such as those described below with respect to the computer system of FIG. 6.

As illustrated, client system 155 may include a content consumption application 200 which may be, for example, a media application configured to utilize media component 230 to consume (e.g., play) content on client system 155. In one example, content consumption application 200 may be an application downloaded onto client system 155 from an external source, such as an application marketplace. In one non-limiting example, content consumption application 200 may be an application configured to play video content subject to one or more DRM policies. In various embodiments, the media component may be a component configured to perform one or more functions for media playback including but not limited to rendering two dimensional or three dimensional images (e.g., frames) or video, rendering video using hardware accelerated interfaces, rendering text and images, de-encoding video and/or audio, and decrypting video and/or audio.

In various embodiments, content consumption application 200 may provide encrypted content 210 to media component 230, which may be responsible for decryption and playback of the content. The content consumption application may also provide decryption key(s) 250 to media component 230. In various embodiments, content consumption application 200 may be configured to provide the decryption key(s) 250 to media component 230 through open interface 220 if and only if one or more security conditions are met. For instance, content consumption application 200 may be configured to provide decryption key(s) 250 for encrypted content 210 to a media component 230 if the content consumption application 200 determines that a security compromise has not occurred on client system 155. For instance, the content consumption component may pass the decryption key(s) to the media component through open interface 220 after ensuring that it is safe for the key to be passed without risk of being exposed to an attacker (e.g., through a debugging application) and/or to malware. For instance, in various embodiments, content consumption application 200 may pass the key to the media component 230 after ensuring that i) one or more security mechanisms of operating system 240 ("OS" 240) have not been compromised and ii) one or more executable instructions of content consumption application 200 have not been tampered (e.g., instructions corresponding to a function that handles the decryption key(s)).

For instance, in various embodiments, operating system 240 may include one or more security mechanisms including but not limited to enforcing a requirement that application on the client system (e.g., content consumption application 200) be approved by an approval authority. For instance, the operating system may ensure that the application has a valid digital signature created by the approval authority. Generally the approval authority may review multiple applications and provide valid digital signatures to approved applications while rejecting other applications. Applications having valid digital signatures created by an approval authority may be referred to as codesigned applications; codesigned applications may be verified on the client device. In some cases, the approval authority may require that application meet certain guidelines and those applications that do not meet such guidelines are rejected. This approach is sometimes referred to as a "walled garden" in some contexts. The approval process may ensure that undesired applications (e.g., malware, spam, etc.) are not permitted to run on the client system. Another security mechanism of a secure operating system, such as operating system 240, includes strict access control. For instance, operating system 240 may restrict individual applications, such as content consumption application 200, to respective views of memory. For instance, within the context of memory access, content consumption application 200 may be limited to reading and/or writing to a specific portion of the client device's memory. That is, operating system 240 may in various embodiments ensure that content consumption application 200 may access its own memory space, but not the memory space of other applications. Likewise, another application (not illustrated) may access its own memory, but not that of content consumption application 200. This type of security mechanism provided by operating system 240 may prevent one application (e.g., an application utilized by an attacker) from accessing or stealing the content decryption key(s) from the content consumption application's memory space. In various cases, this type of security may be referred to as sandboxing.

In some cases, one particular undesired application might include an application designed to steal content decryption keys, such as decryption keys 250. However, as such applications are rejected by the approval authority and lack the requisite digital signature, a properly working OS 240 will prevent such application from executing. In some cases, some users may attempt to alter or replace OS 240 in order to run unapproved applications (e.g., applications lacking the requisite digital signature). This process is sometimes referred to as "jailbreaking" the device; a device that has had one or more of its security mechanisms of its operating system defeated may be referred to as a "jailbroken" device. A client system running a jailbroken operating system may be an insecure environment in which to expose decryption keys 250. Content consumption application 200 may be configured to prevent exposing decryption keys on a jailbroken device by ensuring that one or more conditions have been met, as described in more detail below.

One condition that content consumption application 200 may be configured to enforce as a requirement to provide the decryption key(s) 250 to the media component through open interface 220 includes a condition that ensures no files associated with a jailbroken device are present on client system 155. For instance, when a device is jailbroken, an altered operating system or a replacement operating system may be installed in place of operating system 240. This installation may create certain known files. For instance, files having a certain filename and/or file location may be present on client system 155. Content consumption application 200 may ensure that none of these files are present prior to providing decryption key(s) 250 to media component 230.

Another condition that content consumption application 200 may be configured to enforce as a requirement to provide the decryption key(s) 250 to the media component through open interface 220 includes a condition that ensures an application with an invalid signature cannot be successfully executed on operating system 240. For instance, as described above, applications that have been approved by the approval authority may have a valid digital signature. Legitimate (e.g., unjailbroken) versions of operating system 240 may be configured to ensure that applications have a valid digital signature before successfully executing such application. Illegitimate operating system (e.g., jailbroken operating systems) may disregard this security measure by allowing the execution of applications with invalid signatures or no signatures at all. Content consumption application 200 may be configured to purposely attempt to launch a test application having an invalid signature (or no signature). If operating system 240 permits the test application to run successfully, the content consumption application 200 may determine that the operating system has been jailbroken; in this case, content consumption application 200 may withhold the content decryption keys from media component 230. If operating system 240 does not permit the test application to run successfully, the content consumption application 200 may determine that the operating system has not been jailbroken; in this case, content consumption application 200 may provide the content decryption keys to media component 230 (assuming all other conditions have been met).

Another condition that content consumption application 200 may be configured to enforce as a requirement to provide the decryption key(s) 250 to the media component through open interface 220 includes a condition that ensures prohibited operations are not permitted to be performed on client system 155. For instance, as described above, operating system 240 may in various embodiments ensure that content consumption application 200 may access its own memory space, but not the memory space of other applications. Likewise, another application (not illustrated) may access its own memory, but not that of content consumption application 200. This type of security provided by operating system 240 may prevent one application (e.g., an application utilized by an attacker) from accessing or stealing the content decryption key(s) from the content consumption application's memory space. One way in which content consumption application 200 may test to determine whether operating system 240 is legitimate (e.g., unjailbroken) may include attempting to perform a prohibited operation, such as accessing a memory space assigned to another application. If operating system 240 permits such operation, content consumption application 240 may determine that the operating system is not legitimate and may withhold the content decryption keys from media component 230. If operating system 240 prohibits such operation, content consumption application 240 may determine that the operating system is legitimate and may provide the content decryption keys to media component 230 (assuming all other conditions have been met).

The techniques described above address illegitimate operating systems (e.g., jailbroken devices). Content consumption application 200 may also be configured to prevent exposing the decryption key(s) 250 when a debugging application or utility has been attached to the content consumption application. In some embodiments, operating system 240 may include an anti-debugging function that prevents debugging applications from attaching to applications on the client system. Content consumption application 200 may be configured to ensure that the anti-debugging function has been executed before providing the content decryption keys to media component 230, according to some embodiments. One non-limiting example of an anti-debugging function includes the ptrace system call available on some mobile devices. In various embodiments, content consumption application 200 may be configured to perform a hash check on one or more portions of the executable instructions that make up content consumption application 200. For instance, an expected hash of a portion of the instructions may be compared to an actual hash of that portion of the instructions of content consumption application 200. If the hashes match, it may be inferred that the instructions have not been altered (e.g., altered by an attached debugger). In this case, the content consumption application 200 may determine that a debugger has not been attached and may provide the content decryption keys to media component 230 (assuming all other conditions have been met). If the hashes do not match, it may be inferred that the instructions have been altered (e.g., altered by attachment of a debugger). In this case, the content consumption application 200 may determine that a debugger has been attached and may withhold the content decryption keys from media component 230. In other embodiments, the hash checking technique described above may detect whether any breakpoint has been inserted in a target function by a debugger. A breakpoint would add additional machine instructions to the portion of the memory being checked and thus change the hash value. An attacker may attempt to debug and break the content consumption application at a critical point in order to steal a key, e.g., by checking the stack trace once a breakpoint is hit. The above described technique may detect and/or prevent such attacks.

Generally, when a security compromise of the operating system and/or a debugger attachment is detected according to the techniques described herein, the content consumption component 200 may withhold content decryption key(s) in order to prevent exposing such keys to an attacker.

Example Methods

Figure 3:
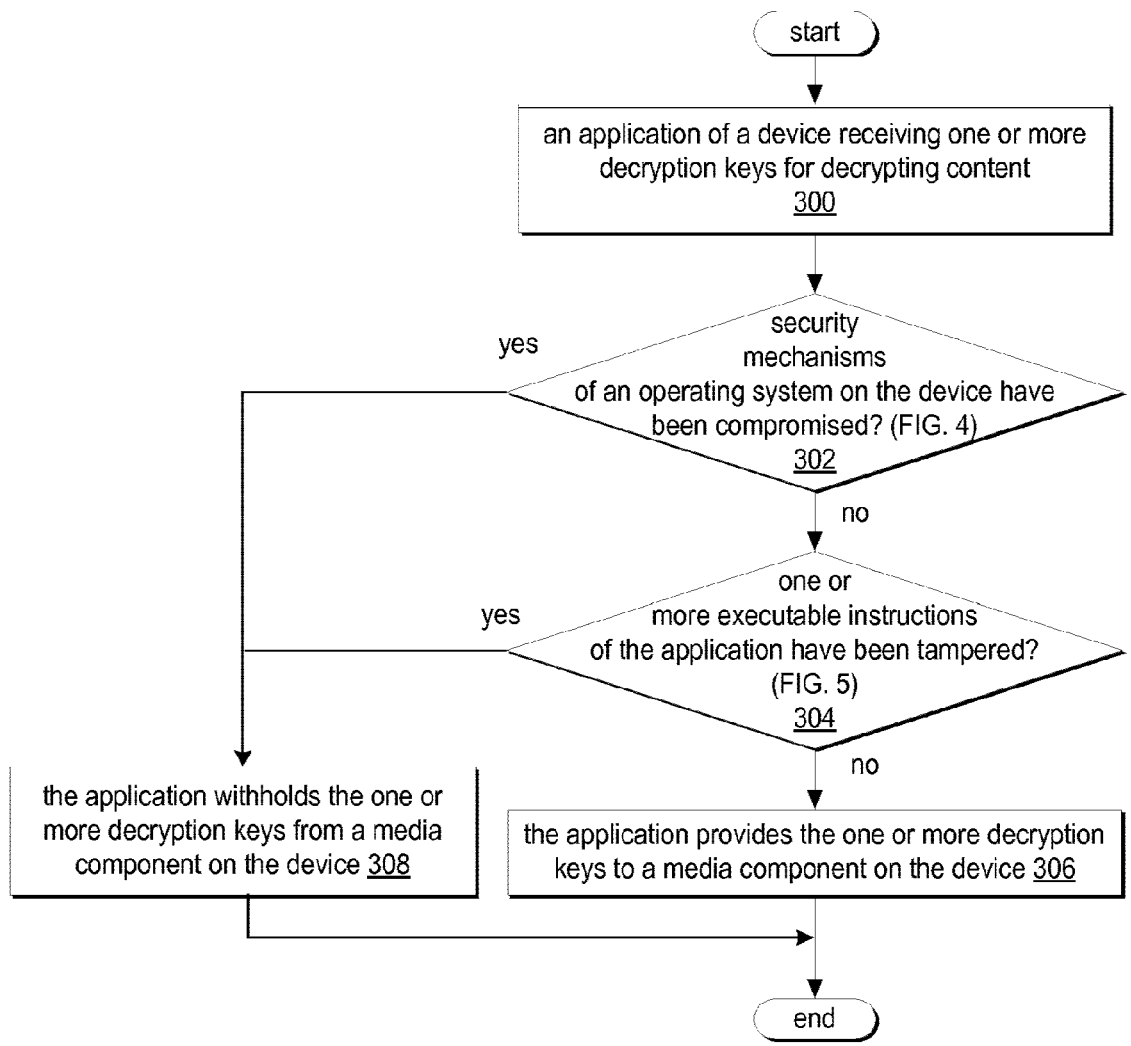
FIG. 3 illustrates a flowchart of an example method for detecting a security compromise and based on that detection withholding or providing content decryption keys, according to some embodiments.
Figure 4:
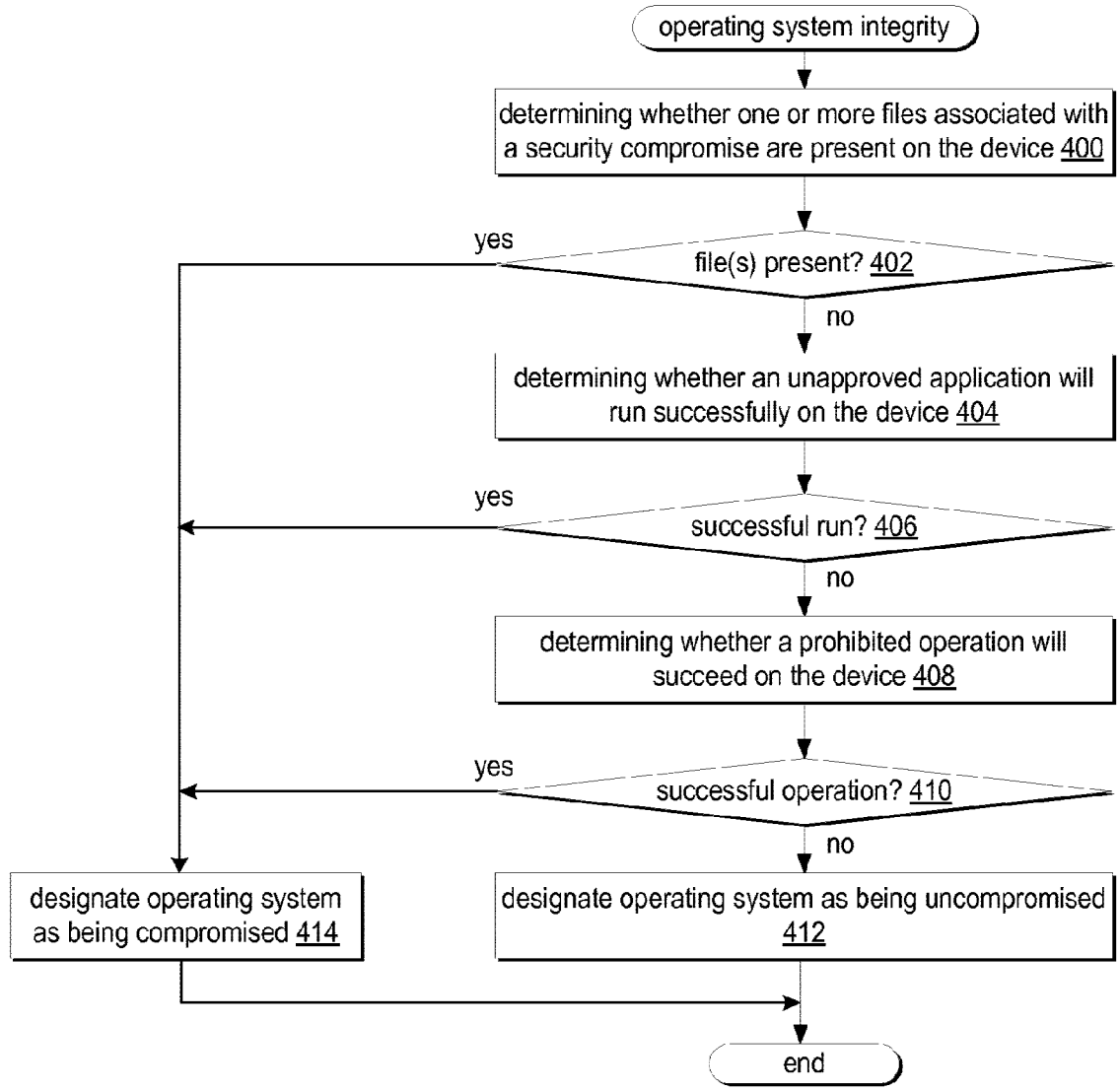
FIG. 4 illustrates a flowchart of an example method for determining the integrity of an operating system, according to some embodiments.
Figure 5:
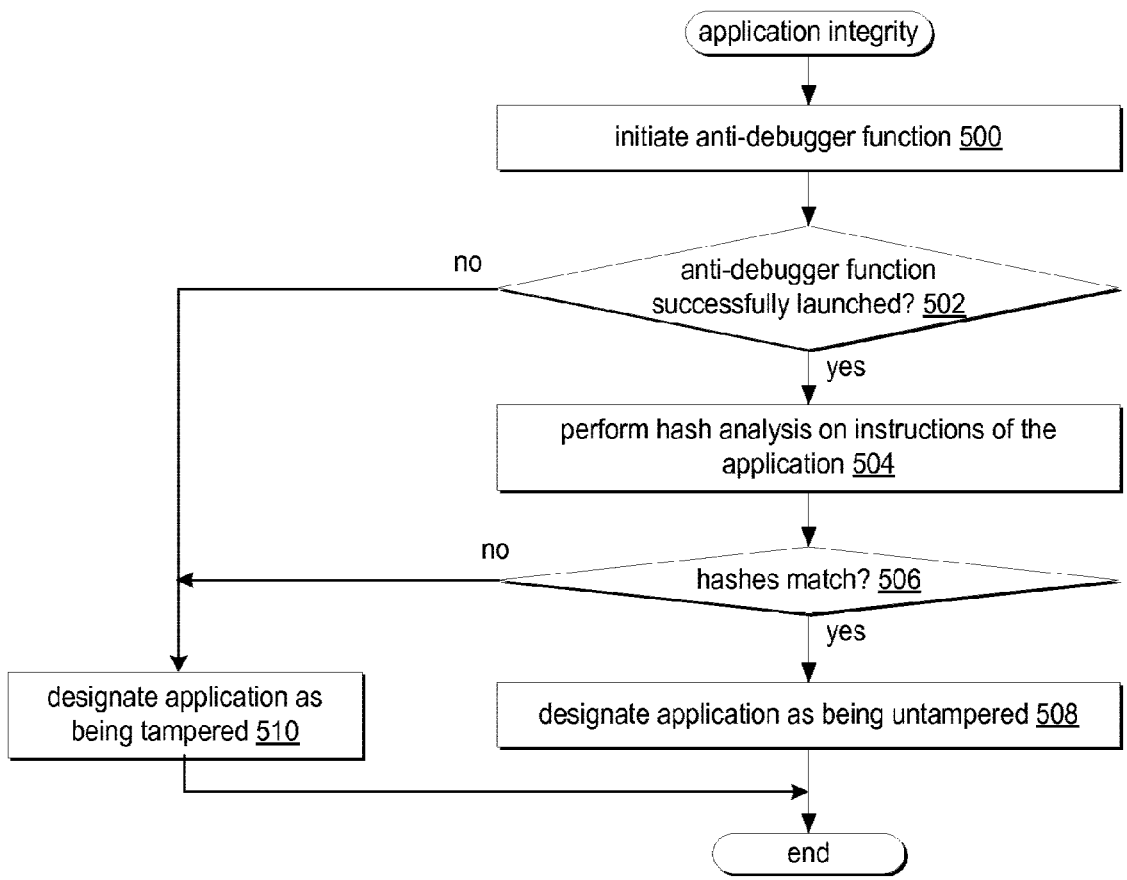
FIG. 5 illustrates a flowchart of an example method for determining the integrity of an application that handles content decryption keys, according to some embodiments.

Embodiments of the system and method for detecting a security compromise on a device may include various methods performed by one or more computer systems or devices. FIGS. 3-5 illustrate examples of such methods. In various embodiments, the illustrated Figures may be implemented by components or systems described herein. In some embodiments, the methods described herein may be implemented on one or more computer systems, such as the computer system of FIG. 6 described below.

FIG. 3 illustrates a method for providing decryption keys in response to determining that certain conditions have been met, namely that security mechanisms of an operating system have not been compromised and that instructions of an application (that handles the decryption keys) have not been tampered. An example of the application in the illustrated method may include content consumption application 200 described above. An example of the operating system in the illustrated method may include operating system 240 described above.

In the illustrated embodiment, the method may begin with an application (e.g., a content consumption application) of a device (e.g., a client system, such as client system 155) receiving one or more decryption keys for decrypting content. For instance, this portion of the method may include acquiring a license including decryption keys, such as described above with respect to license acquisition 165. The method may include performing one or more checks before providing keys to other components, such as a media component (e.g., 230). For instance, as described above, techniques may be utilized to ensure that it is safe to send decryption keys over an open interface, such as interface 220, before providing the keys to the media component. At block 302, the method may include determining whether security mechanisms of the operating system on the device have been compromised. For instance, as described above, an operating system may provide various security mechanisms to protect the integrity of the device on which it operates. Specific examples of performing the determination of block 302 are described in more detail below with respect to FIG. 4. As described above, these security mechanisms may include but are not limited to application approval by an approval authority, codesigning, and restrictions on memory and/or operations (e.g., sandboxing). In response to determining a compromise of the security mechanism(s), the method may include causing the application to withhold the one or more decryption keys from the media component of the device. In response to determining that the security mechanism(s) have not been compromised, the method may proceed to block 304 to perform additional checks regarding the integrity of the application itself.

As illustrated at block 304, the method may include determining whether one or more executable instructions of the application (e.g., the content consumption application) have been tampered. As described above, one type of tampering that may be detected includes the attachment of a debugger to the application. Specific examples of performing the determination of block 304 are described in more detail below with respect to FIG. 5. In response to determining that the application has been tampered, the method may include causing the application to withhold the one or more decryption keys from the media component of the device. In response to determining that the application has not been tampered, the method may proceed to block 306 in which case the application, responsive to determining that the computing environment is safe in accordance with the checks of block 302 and 304, provides the one or more decryption keys to the media component on the device, such as the passing of decryption key(s) 250 described above.

FIG. 4 illustrates a flowchart of an example method for determining whether an operating system of a device has been compromised (e.g., altered or replaced). The illustrated method represents one example of determining whether security mechanisms of an operating system have been compromised (e.g., block 302 described above). As illustrated, block 400 may include determining whether one or more files associated with a security compromise are present on the device. For instance, when a device is jailbroken (described above), an altered operating system or a replacement operating system may be installed in place of the original, legitimate operating system. This installation may create certain known files. For instance, files having a certain filename and/or file location may be present on the client system hosting the operating system. As another example, a file associated with a security compromise may have specific content. The method may check for these files by filename or by the contents of the file at various locations. To guard against file renaming, the method may check for more than just filenames indicating a security compromise. The method may also check different files, directory structures, and content of files for indications of a security compromise. If such files or content are present, the operating system may be designated as compromised, as illustrated by the positive output of block 402. If such files or content are not present, the method may proceed to block 404, as illustrated by the negative output of block 402.

At block 404, the method may include determining whether an unapproved application will run successfully on the device. For instance, as described above, a legitimate the operating system may ensure that the application has a valid digital signature created by an approval authority. Generally the approval authority may review multiple applications and provide valid digital signatures to approved application while rejecting other application. Applications having valid digital signatures created by an approval authority may be referred to as codesigned applications; codesigned applications may be verified on the client device. In some cases, the approval authority may require that applications meet certain guidelines and those applications that do not meet such guidelines are rejected. This approach is sometimes referred to as a "walled garden" approach in some contexts. The approval process may ensure that undesired applications (e.g., malware, spam, etc.) are not permitted to run on the client system. In various embodiments, if it is determined that an unapproved application (e.g., an application without a valid digital signature from the approval authority) will run successfully on the device, the method may include designating the operating system as being compromised at block 414, as illustrated by the positive output of block 406. If it is determined that an unapproved application (e.g., an application without a valid digital signature from the approval authority) will not run successfully on the device, the method may include proceeding to block 408, as illustrated by the negative output of block 406.

As illustrated at block 408, the method may include determining whether a prohibited operation will succeed on the device. For instance, as described above, a characteristic of a secure operating system includes strict access control. For instance, an operating system may restrict individual applications, such as a content consumption application, to respective views of memory. For instance, within the context of memory access, a content consumption application may be limited to reading and/or writing to a specific portion of memory. That is, the operating system may in various embodiments ensure that the content consumption application may access its own memory space, but not the memory space of other applications. Likewise, another application may access its own memory, but not that of the content consumption application. This type of security provided by the operating system may prevent one application (e.g., an application utilized by an attacker) from accessing or stealing the content decryption key(s) from the content consumption application's memory space. This type of security is described above as sandboxing. One type of test operation that may be performed at block 408 includes causing the content consumption application to attempt to access (e.g., read form or write to) a memory space of another application (or vice versa, having another application attempt to access the content consumption applications memory space). If the test operation is successful (e.g., a successful read or write outside of an application's designated memory space), the method may include designating the operating system as being compromised at block 414, as illustrated by the positive output of block 410. If the test operation is not successful (e.g., an unsuccessful read or write outside of an application's designated memory space), the method may include designating the operating system as being uncompromised at block 412, as illustrated by the negative output of block 410.

While FIG. 4 addresses the integrity of the operating system, FIG. 5 illustrates an example method for determining whether the key handling application (e.g., a content consumption application) has been tampered with. As illustrated at block 500, the method may include initiating an anti-debugger function. For instance, in some embodiments, the operating system may include an anti-debugging function that prevents debugging applications from attaching to applications on the client system. The method may include ensuring that the anti-debugging function has been executed before providing the content decryption keys to a media component, according to some embodiments. One non-limiting example of an anti-debugging function includes the ptrace system call available on some mobile devices As illustrated at block 502, if the anti-debugger is not successfully launched (e.g., an attacker has altered the content consumption application to prevent the anti-debugger function from launching), the method may proceed to block 510 to designate the application as being tampered, as illustrated by the negative output of block 502. If the anti-debugger is successfully launched (e.g., an attacker has not altered the content consumption application to prevent the anti-debugger function from launching), the method may proceed to block 504, as illustrated by the positive output of block 502.

As illustrated at block 504, the method may also include performing a hash analysis on instructions of the application. In various embodiments, this portion of the method may include performing a hash check on one or more portions of the executable instructions that make up the content consumption application that handles the decryption keys. For instance, an expected hash of a portion of the instructions (or portion of memory storing the instructions) may be compared to an actual hash of that portion of the instructions of the content consumption application. If the hashes match, it may be inferred that the instructions have not been altered or had any breakpoints inserted (e.g., by an attached debugger). In this case, the method may proceed to block 508 to designate that the content consumption application is untampered (e.g., a debugger has not tampered with the executable instructions of the application), as illustrated by the positive output of block 506. If the hashes do not match, it may be inferred that the instructions have been altered or had one or more breakpoints or other instructions inserted (e.g., by a debugger); the method may proceed to designate the application as being tampered at block 510, as illustrated by the negative output of block 506.

As illustrated, when the techniques of FIGS. 4 and 5 are incorporated as part of the method of FIG. 3 described above, any scenario in which the integrity of the operating system and/or the content consumption application (or any other application that handles the content decryption keys) may trigger the content consumption application's withholding of content decryption keys from other components of the device, such as the media component. In various embodiments, this may prevent the keys from being exposed to an attacker that might use the key for unscrupulous purposes, such as to decrypt protected content, bypass DRM policies, and/or distribute such content in clear form.

Secure Communication

In various embodiments, various elements of the illustrated framework may be associated with respective public key—private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 1. One example includes the "binding" of a content license to client system at license acquisition time. For example, the license server might obtain a public key for the client system and encrypt a content license with that public key prior to transferring the license to the playback device. In this example, only client system will be able to decrypt the license (since the playback device may be the only element with knowledge of the correct private key). In some embodiments, a given element may trust another element with knowledge of its private key (thereby allowing the other element to decrypt data encrypted with the given element's public key). In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for detecting a security compromise on a device, as described herein, may be executed on one or more computer systems, which may interact with various other devices. One such computer system is computer system 600 illustrated by FIG. 6, which may in various embodiments implement any of the systems, devices, elements or methods illustrated in FIGS. 1-5. For instance, any of the functionality described above with respect to client system 155 may be stored in memory as processor-executable executable program instructions 622 (e.g., program instructions executable by processor(s) 610). In one non-limiting example, instructions 622 may implement a content consumption application 200, media component 230 and/or operating system 240, as illustrated. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, program instructions 622 may be executable by the processor(s) to implement the functionality of any packaging component, assembler component, encryption component, decryption component, or client system described above. In various embodiments, data 632 may store any of the data described above including but not limited to content and/or content decryption keys. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the computer system, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 685), such as other computer systems (e.g., license server 160 or content delivery system(s) 140), or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the process or methods described above, such as those of FIGS. 3-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method for verifying security mechanisms of an operating system, the method comprising:
receiving, via a security application executing on a computer, one or more decryption keys configured to enable a media component on the computer to decrypt encrypted content;
determining, via the security application executing on the computer, whether a replacement operating system or an altered operating system is present on the computer;
determining, via the security application executing on the computer, that one or more security mechanisms of the operating system of the computer are not compromised in response to a replacement operating system or an altered operating system not being present on the computer;
attempting, via the security application executing on the computer, to initiate execution of an insecure application through the operating system;
determining, via the security application executing on the computer, that the one or more security mechanisms of the operating system are not compromised in response to the operating system preventing execution of the insecure application; and
providing, via the security application executing on the computer, the one or more decryption keys to the media component on the computer in response to determining that the one or more security mechanisms of the operating system of the computer are not compromised.

2. The computer-implemented method of claim 1, wherein to determine whether a replacement operating system or an altered operating system is present on the computer, the security application executing on the computer determines whether a file indicative of a replacement operating system or an altered operating system is present on the computer.

3. The computer-implemented method of claim 2, wherein to determine whether the file is present on the computer, the security application executing on the computer determines that a file having a specific file name or content associated with a replacement operating system or an altered operating system is present on the computer.

4. The computer-implemented method of claim 1, wherein the insecure application does not have a valid digital signature associated with approval by an approval authority.

5. The computer-implemented method of claim 1, further comprising:
   generating, via the security application executing on the computer, a hash based on one or more executable instructions of a function of the security application that handles the one or more decryption keys;
   determining, via the security application executing on the computer, that the one or more instructions of the security application are not compromised in response to the generated hash matching a hash generated from an unaltered version of the function; and
   providing, via the security application executing on the computer, the one or more decryption keys to the media component on the computer in response to determining that the one or more instructions of the security application are not compromised.

6. The computer-implemented method of claim 5, wherein to generate the hash the security application executing on the computer generates a cyclic redundancy check (CRC) code based on the one or more executable instructions of the function that handles the one or more decryption keys.

7. The computer-implemented method of claim 1, further comprising:
   attempting, via the security application executing on the computer, to access a memory space assigned by the operating system of the computer to another application to test whether one or more security mechanisms of the operating system are compromised; and
   determining, via the security application executing on the computer, that the one or more security mechanisms of the operating system are not compromised in response to the operating system not permitting the security application to access the memory space assigned to the other application.

8. The computer-implemented method of claim 1, further comprising:
   causing, via the security application executing on the computer, another application executing on the computer to access a memory space assigned by the operating system to the security application; and
   determining that the one or more security mechanisms of the operating system are not compromised in response to the operating system not permitting the other application to access the memory space assigned to the security application.

9. The computer-implemented method of claim 1, wherein the one or more decryption keys are received as part of an encrypted content license and the method further comprises:
   receiving, via the security application executing on the computer, the encrypted content license from a license server; and
   decrypting, via the security application executing on the computer, the encrypted content license with a public key associated with the computing device effective to enable the security application to access the one or more decryption keys.

10. A system, comprising:
    one or more hardware-based processors;
    one or more hardware-based computer-readable storage media comprising processor-executable instructions that, responsive to execution by the one or more hardware-based processors, implement a security application to perform operations comprising:
      receiving, via the security application executing on the system, one or more decryption keys configured to enable a media component on the system to decrypt encrypted content;
      determining, via the security application executing on the system, whether a file indicative of a replacement operating system or an altered operating system is present on the system;
      determining, via the security application executing on the system, that one or more security mechanisms of an operating system of the system are not compromised in response to the file indicative of a replacement operating system or an altered operating system not being present on the system;
      attempting, via the security application executing on the system, to initiate execution of an insecure application through the operating system of the system;
      determining, via the security application executing on the system, that the one or more security mechanisms of the operating system are not compromised in response to the operating system preventing execution of the insecure application; and
      providing, via the security application executing on the system, the one or more decryption keys to the media component on the system in response to determining that the one or more security mechanisms of the operating system of the system are not compromised.

11. The system of claim 10, wherein to determine whether the file is present on the system, the security application executing on the system determines that a file having a specific file name or content associated with a replacement operating system or an altered operating system is present on the system.

12. The system of claim 11, wherein the one or more decryption keys are received with, or as part of, a license associated with the encrypted content.

13. The system of claim 10, wherein the operations further comprise:
    attempting, via the security application executing on the system, to access a memory space assigned by the operating system of the computer to another application to test whether one or more security mechanisms of the operating system are compromised; and
    determining, via the security application executing on the system, that the one or more security mechanisms of the operating system are not compromised in response to the operating system not permitting the security application to access the memory space assigned to the other application.

14. The system of claim 10, wherein the operations further comprise:

causing, via the security application, another application being executed by the one or more hardware-based processors to attempt to access a memory space of the security application; and determining, via the security application executing on the system, that the one or more that the one or more security mechanisms of the operating system are not compromised in response to the operating system not permitting the other application to access the memory space assigned to the security application.

15. The system of claim 10, wherein the insecure application comprises a test application that is associated with the security application and has an invalid digital signature.

16. A computer-readable storage device comprising processor-executable instructions that, responsive to execution by one or more processors, implement a security application to perform operations comprising:

receiving, via the security application executing on the one or more processors, one or more decryption keys configured to enable a media component of a computing device to decrypt encrypted content;

determining, via the security application executing on the one or more processors, whether a replacement operating system or an altered operating system is present on the computing device;

determining, via the security application executing on the one or more processors, that one or more security mechanisms of an operating system of the computing device are not compromised in response to a replacement operating system or an altered operating system not being present on the computing device;

attempting, via the security application executing on the one or more processors, to initiate execution of an insecure application through the operating system of the computing device;

determining, via the security application executing on the one or more processors, that the one or more security mechanisms of the operating system are not compromised in response to the insecure application not being able to run on the computing device; and providing, via the security application executing on the one or more processors, the one or more decryption keys to the media component of the computing device in response to determining that the one or more security mechanisms of the operating system of the computing device are not compromised.

17. The computer-readable storage device system of claim 16, wherein the operations further comprise:

generating, via the security application executing on the one or more processors, a hash based on one or more processor-executable instructions of a function of the security application that handles the one or more decryption keys;

determining, via the security application executing on the one or more processors, that the processor-executable instructions of the security application are not compromised in response to the generated hash matching a hash generated from an unaltered version of the function; and providing, via the security application executing on the one or more processors, the one or more decryption keys to the media component of the computing device in response to determining that the processor-executable instructions of the security application are not compromised.

18. The computer-readable storage device system of claim 16, wherein the operations further comprise:

initiating, via the security application executing on the one or more processors, execution of an anti-debugging function of the operating system, the anti-debugging function configured to prevent debugging applications from intercepting the decryption keys;

determining, via the security application executing on the one or more processors, that the processor-executable instructions of the security application are not altered in response to the anti-debugging function executing and preventing the debugging applications from intercepting the decryption keys; and providing, via the security application executing on the one or more processors, the one or more decryption keys to the media component of the computing device in response to determining that the processor-executable instructions of the security application are not altered.

19. The computer-readable storage device system of claim 18, wherein execution of the anti-debugging function is effective to prevent the debugging applications from attaching to the security application.

20. The computer-readable storage device system of claim 16, wherein the one or more decryption keys are received as part of an encrypted content license and the operations further comprise:

receiving the encrypted content license from a license server; and decrypting the encrypted content license with a public key associated with the computing device effective to enable the security application to access the one or more decryption keys.

* * * * *